W. C. ROBINSON.

FITTING FOR ELECTRIC CONDUITS.

APPLICATION FILED MAR. 30, 1911.

Reissued Oct. 8, 1912. 13,475.

WITNESSES:

J. Herbert Bradley

Francis J. Tomarron

INVENTOR

William C. Robinson by Christy & Christy,

Atty's

UNITED STATES PATENT OFFICE.

WILLIAM C. ROBINSON, OF PITTSBURGH, PENNSYLVANIA.

FITTING FOR ELECTRIC CONDUITS.

13,475. Specification of Reissued Letters Patent. Reissued Oct. 8, 1912.

Original No. 971,216, dated September 27, 1910, Serial No. 499,225. Application for reissue filed March 30, 1911. Serial No. 618,044.

*To all whom it may concern:*

Be it known that I, WILLIAM C. ROBINSON, residing at Pittsburgh, in the county of Allegheny and State of Pennsylvania, a citizen of the United States, have invented or discovered certain new and useful Improvements in Fittings for Electric Conduits, of which improvements the following is a specification.

The invention described herein relates to certain improvements in means for connecting lamps, switches, branch lines, etc., to circuits having the conductors arranged within metallic conduits.

The invention is hereinafter more fully described and claimed.

Figure 1:
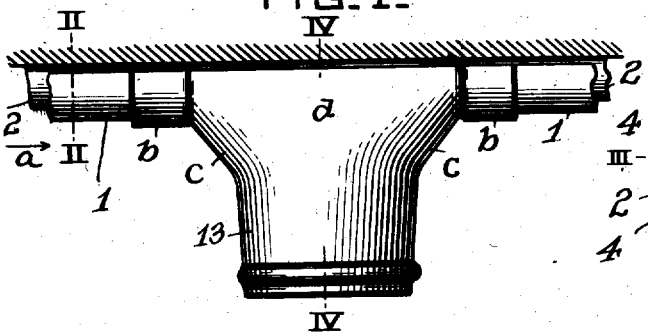
Figure 2:
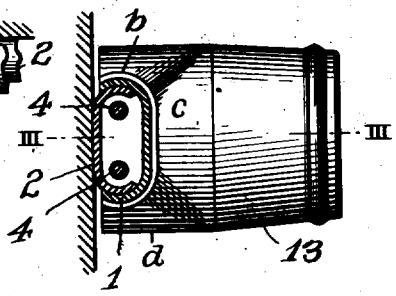
Figure 3:
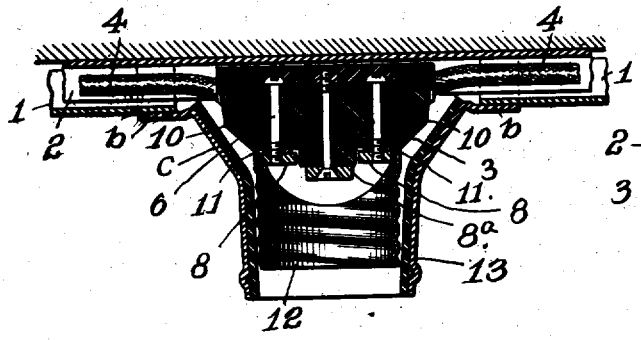
Figure 4:
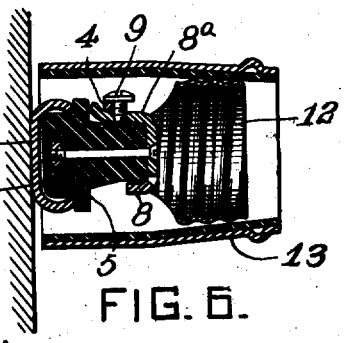
Figure 5:
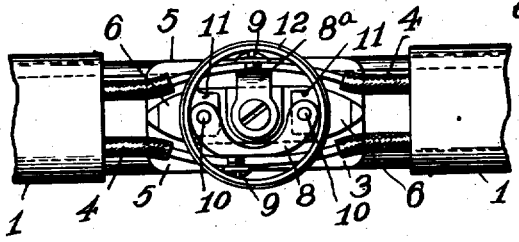
Figure 6:
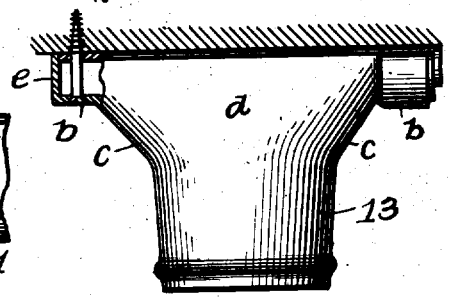
Figure 7:
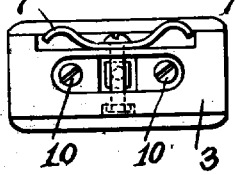
Figure 8:
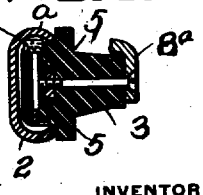

In the accompanying drawings illustrating an embodiment of the said invention, Figure 1 is a view in elevation of a conduit and a cap piece in position thereon at the point of connection; Fig. 2 is a view in cross-section on the line II—II of Fig. 1, looking in the direction of the arrow *a*; Fig. 3 is a sectional elevation on the line III—III of Fig. 2; Fig. 4 is a view in cross-section on the line IV—IV of Fig. 1; Fig. 5 is a plan view of the connection, with the cap piece removed; Fig. 6 is a view similar to Fig. 1 showing a connection at the dead end of a conduit; Fig. 7 is an underside plan view of the block 3, showing means for securing it in the conduit; Fig. 8 is a cross-sectional view showing said block in position in the conduit.

The form of conduit shown herein is a molding of elliptical form, made up of a base or body strip 2, and a cover strip 1 which is snapped upon the body strip; but the invention is adapted to be used with the common tubular conduit or any other of suitable form. In the practice of the invention as herein illustrated, the cover 1 is cut away for a short distance on each side of the point of connection of the branch line, which may lead to a lamp or any other translating device. A block 3, preferably of insulating material, hereinafter termed the connecting block, is placed within the opened portion of the conduit intermediate of the conductors 4. While not necessary it is preferred that seats or shelves 5 should be formed in the block for the reception of the conductors 4. And it is also preferred that said seats or shelves should be formed on opposite sides of an upwardly projecting ridge 6 on the block, and should respectively cover the opposite edges of the conduit strip 2, so that the conductors 4 bearing on these seats will assist in holding the block 3 in position in the conduit, and contact between the conductors and the strip 2 will be effectively prevented. While not necessary a spring 7 may be so secured to the block that when the latter is placed in position the spring will bear against one of the side walls of the conduit under the curled over edge *a* of the same, as clearly shown in Figs. 7 and 8.

The block 3 is provided on opposite sides of the ridge 6 with metal terminals 8, 8ª, of any suitable construction, whereby the terminals may be electrically connected to the conductors 4 at points from which the insulation is removed for that purpose. In the construction shown the means for connecting the terminals to the conductors consist of screws 9. The bared portions of the conductors are placed under the heads of the screws, which when screwed into the terminal plates will clamp the conductors against the plates. The conductors of the branch line are connected to the terminals by any suitable means. In the construction shown, where the branch line is formed by an incandescent lamp socket, one of the terminals as 8 is formed with forks or prongs at one end which are bent over to bear on top of the ridge 6, as shown in Figs. 3, 4, 5 and 9, and are held by screws 10 or other suitable means in electrical engagement with lugs 11 on the lamp socket 12. The other terminal 8ª is constructed and arranged to contact with the inner lamp terminal.

After the connecting block has been placed in position, and the electrical connections formed, the cap 13 is placed in position. This cap is preferably metallic, provided with an opening for the branch line, herein shown as circular to inclose the lamp-socket 12, and having opposite end portions of such form and dimensions that they may be snapped upon and grip the conduit, preferably overlapping and bridging the cut-away ends of the cover section 1. The cap being metallic, the electrical continuity of the conduit is preserved, but at and adjacent to the point of connection of the main and branch lines the cap should be lined with insulating material, as shown in Figs. 3 and 4. Where the branch circuit is connected to the main conductors at the end of the conduit, one of the gripping portions *b* of the cap is provided with a wall *e* adapted to close the conduit, as shown in Fig. 6.

I claim herein as my invention:

1. As a means for connecting branch lines to conductors inclosed in conduits, the combination of a block placed within a conduit, terminals for the conductors carried by the block but insulated from each other, and a cap provided with an opening for the reception of the branch conductors and having means for clamping the conduit inclosing the main conductors.

2. As a means for connecting branch lines to conductors inclosed in conduits, the combination of a block placed within a conduit, terminals for the conductors carried by the block but insulated from each other, and means carried by the block for securing the block within the conduit.

3. As a means for connecting lamps to conductors inclosed in conduits, the combination of a block placed within a conduit, a lamp-socket carried by the block, a terminal connecting the socket to one of the conductors, a second terminal for the other conductor in position to contact with the inner terminal of the lamp, said terminals being insulated from each other, and a cap provided with a tubular portion to inclose the socket and having means for clamping the conduit on opposite sides of the point of connection of the branch to the main conductors.

4. A metallic cap for inclosing the junction of branch conductors with conductors inclosed in a conduit, provided with resilient gripping portions to clamp the conduit on opposite sides of the junction point, an opening in the cap for the branch conductors, and a lining of insulating material fitted within the cap at and adjacent to the junction point.

5. A cap for inclosing the junction of branch conductors with conductors inclosed in a conduit, consisting of a tubular portion and with resilient gripping portions on opposite sides of the tubular portion to clamp the cap in position on the conduit.

6. The combination with an outwardly open section of a conduit for electrical conductors, of a block of insulating material having a portion fitting within said open conduit section, oppositely disposed shelves covering the opposite edges of said conduit section, and a portion projecting outwardly from said shelves, and electrical terminals arranged on opposite sides of said outwardly projecting portion of the block.

7. The combination with an outwardly open semi-elliptical base member of a sectional conduit, of a block having an elongated base portion fitting within said conduit section, oppositely disposed shelves covering the opposite edges of said conduit section, and a ridge projecting outwardly from said shelves, and electrical terminals arranged on opposite sides of said ridge.

8. A connecting block of insulating material having an elongated base portion, a pair of shelves projecting from opposite sides of said base portion, and a ridge projecting upwardly between said shelves.

In testimony whereof I have hereunto set my hand this 27th day of March, A. D. 1911.

WILLIAM C. ROBINSON.

Witnesses:

ALICE A. TRILL,

MARSHALL A. CHRISTY.

Copies of this patent may be obtained for five cents each, by addressing the "Commissioner of Patents, Washington, D. C."